United States Patent [19]
Ushitora et al.

[11] Patent Number: 5,575,454
[45] Date of Patent: Nov. 19, 1996

[54] VACUUM VALVE

[75] Inventors: Akihiro Ushitora; Osamu Shimizu, both of Kanagawa-ken, Japan

[73] Assignee: Ebara Corporation, Tokyo, Japan

[21] Appl. No.: 309,679

[22] Filed: Sep. 21, 1994

[30]     Foreign Application Priority Data

Sep. 22, 1993  [JP]  Japan .................................. 5-259050

[51] Int. Cl.$^6$ ................................................ F16K 31/126
[52] U.S. Cl. .......................................... 251/61.5; 137/205
[58] Field of Search ..................................... 251/61.5, 318, 251/333, 320, 321, 324, 61, 61.2, 61.3, 61.4, 331; 137/205

[56]              References Cited

U.S. PATENT DOCUMENTS

| | | |
|---|---|---|
| 2,269,404 | 1/1942 | Haven . |
| 3,812,398 | 5/1974 | Kozel et al. ............................ 251/331 |
| 5,082,238 | 1/1992 | Grooms et al. ....................... 251/61.5 |
| 5,280,872 | 1/1994 | Yamanaka .............................. 251/61.5 |

FOREIGN PATENT DOCUMENTS

| | | |
|---|---|---|
| 0544261A1 | 2/1993 | European Pat. Off. . |
| 5-57083 | 1/1992 | Japan . |
| 5-87089 | 4/1992 | Japan . |
| 6-2786 | 6/1992 | Japan . |
| 5-240373 | 11/1992 | Japan . |

Primary Examiner—Kevin Lee
Attorney, Agent, or Firm—Armstrong, Westerman, Hattori, McLeland & Naughton

[57]              ABSTRACT

A vacuum valve including a casing having an inlet opening, an outlet opening, and a valve seat, a valve body accommodated in the casing and adapted to move rectilinearly between a position where it rests on the valve seat and a position which is away from the valve seat, means for pressing the valve body to the resting position, and a piston chamber in which an air differential pressure acts so as to separate the valve body from the valve seat against the pressing means, wherein the casing has a front wall portion which is at an acute angle to the direction of a streamline connecting the inlet and outlet openings and so that elongate foreign matter flowing in from the inlet opening can readily flow out, and side and rear wall portions expanding outwardly in a direction approximately perpendicular to the axis of the valve from a position near the valve seat so that bulk foreign matter flowing in from the inlet opening will not get caught between the valve body and the casing inner wall.

4 Claims, 5 Drawing Sheets

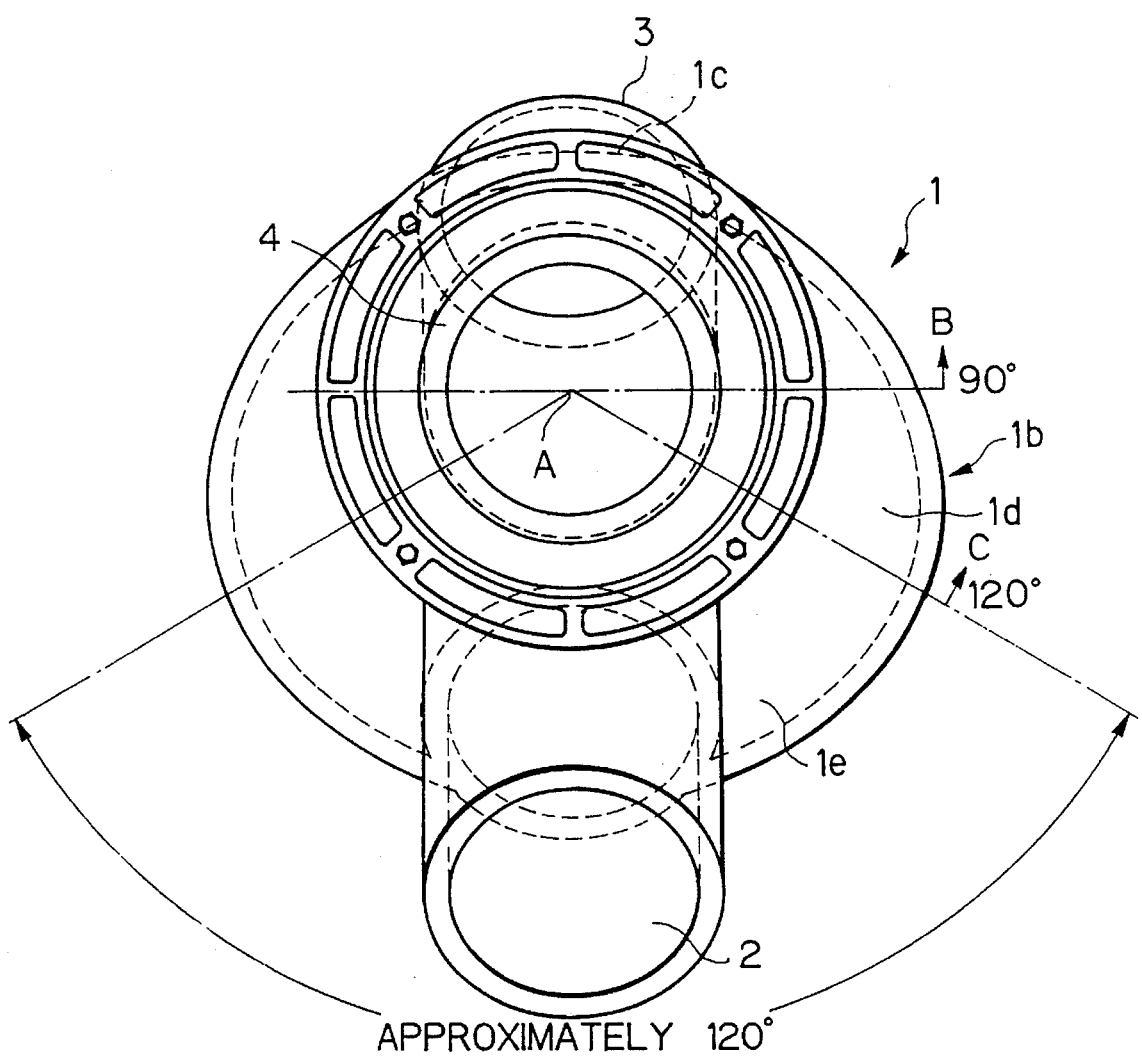

5,575,454

VACUUM VALVE

BACKGROUND OF THE INVENTION

1. Field of the Art

The present invention relates to a vacuum valve and, more particularly, to a vacuum valve which may be suitably used in a vacuum sewer system in which soiled water, e.g., domestic waste water, is transported by vacuum.

2. Prior Art

Since conventional gravity flow type sewer systems suffer from the problem that the maintenance of conduit tends to be costly, vacuum sewer systems have recently attracted attention. In general, a vacuum sewer system is composed of three parts, that is, a soiled water basin or house inlet equipped with a vacuum valve, a vacuum sewer pipe, and a vacuum pump station.

Domestic soiled water is collected by gravity flow in the soil water basin equipped with a vacuum valve. As the liquid level in the soiled water basin rises to a predetermined level, a vacuum valve control mechanism detects it and opens the valve. Thus, the soiled water collected in the soiled water basin is sucked into the vacuum sewer pipe. The vacuum valve continues to remain open for a predetermined period of time even after the soiled water has been sucked in, and air is also sucked in during this period. The soiled water in the pipe is pushed by the expanding air in the pipe and carried to a vacuum pump station in the form of a mixed-phase flow. When a certain amount of soiled water has been collected in a collecting tank, the water is sent to a sewage treatment plant of a public sewage system by a soiled water booster pump.

The conventional vacuum valve that is used in the above-described vacuum sewer system, however, suffers from the problem that since the gap between valve body and the inner wall surface of the valve casing is small, when the valve is open or closed, bulk foreign matter, e.g., pebbles, is likely to get caught in the gap, thus interfering with the movement of the valve body. Since the above-described gap is constantly uniform along the stroke of the valve body for the purpose of guiding the valve body, there is always a likelihood of foreign matter getting caught in the gap when the valve body operates. If the valve body remains in a half-open position because foreign matter has been caught in the gap, the vacuum in the entire system is destroyed, causing a breakdown in the vacuum sewer system.

To solve the above-described problems, the present applicant has proposed a vacuum valve such as that shown in FIG. 5 as Japanese Patent Application No. 4-336571 (1992) (Japanese Patent Public Disclosure No. 5-240373). The vacuum valve V has a casing 31, a valve body 35 disposed in the casing 31 in such a manner as to be movable obliquely, and a valve rod 36 for supporting the valve body 35.

The casing 31 has a bottom wall 31a, and a side wall 31b which obliquely extends from the bottom wall 31a. The casing 31 has an inlet opening 32 and an outlet opening 33. The axes of the inlet and outlet openings 32 and 33 lie along a horizontal straight line. In addition, a valve seat 34 is formed on the bottom of the casing 31.

Thus, the casing 31 has the casing side wall 31b expanding outwardly in a direction approximately perpendicular to the axis x of the valve from a position near the valve seat 34 over 360 degrees around the axis x. By this arrangement, bulk foreign matter, e.g., pebbles, flowing in from the inlet opening 32 are prevented from getting caught between the valve body 35 and the casing inner wall. The degree of expansion of the casing side wall 31b is so set that when the valve body 35 is released from the position where it rests on the valve seat 34, the distance between the outer peripheral portion of the valve body 35 and the casing inner wall is 0.8D or more (D is the bore of the inlet opening 32).

The vacuum valve having the above-described arrangement is capable of extremely effectively preventing bulk foreign matter, e.g., pebbles, with a diameter not larger than 0.8D from getting caught between the valve body 35 and the causing inner wall. However, the conventional vacuum valve suffers from the problem that, as shown in FIG. 5, elongate foreign matter F, e.g., disposable wooden chopsticks, is likely to get caught between the casing inner walls. To ascertain the cause of the problem, the present applicant repeatedly conducted experiments while elongate foreign matter was allowed to flow in the vacuum valve. As a result, it was found that in the improved casing proposed in Japanese Patent Application No. 4-336571 (1992), the casing has a front wall portion A where the casing inner wall is at an obtuse angle to the direction of a streamline S connecting the inlet and outlet openings, as shown in FIG. 5. Therefore, if elongate foreign matter F, e.g., disposable wooden chopsticks, comes into contact with this portion, the head of the elongate foreign matter is pushed up along the wall surface by a soiled water flow. As a result, such foreign matter gets caught between the casing walls.

SUMMARY OF THE INVENTION

In view of the above-described circumstances, it is an object of the present invention to provide a vacuum valve having a structure which prevents elongate foreign matter, e.g., disposable wooden chopsticks, from getting caught between the casing walls when the valve is operated while preventing bulk foreign matter from getting caught between the valve body and the casing inner wall.

To attain the above-described object, the present invention provides a vacuum valve including a casing having an inlet opening, an outlet opening, and a valve seat, a valve body accommodated in the casing and adapted to move rectilinearly between a position where it rests on the valve seat and a position which is away from the valve seat, means for pressing the valve body to the resting position, and a piston chamber in which an air differential pressure acts so as to separate the valve body from the valve seat against the pressing means, wherein the casing has a front wall portion which is at an acute angle to the direction of a streamline connecting the inlet and outlet openings so that elongate foreign matter flowing in from the inlet opening can readily flow out, and side and rear wall portions expanding outwardly in a direction approximately perpendicular to an axis of the valve from a position near the valve seat so that bulk foreign matter flowing in from the inlet opening will not get caught between the valve body and the casing inner wall.

In a vacuum valve of this invention, it is preferable that, when the valve body is released from the resting position, the distance between an outer peripheral portion of the valve body and a casing inner wall is at least 0.8 times the diameter of the inlet opening over a range of at least 120 degrees around the valve axis.

Further, the acute angle should preferably be not larger than 60 degrees.

In addition, the front wall portion preferably has such a slope that when elongate foreign matter longer than 4D/3 (where D is the bore of the inlet opening) flows in at the largest angle to an inner wall of a suction pipe having the same bore as the bore D and comes in contact with the front wall portion while keeping the posture, the foreign matter and the front wall portion are at an acute angle to each other.

The above and other objects, features and advantages of the present invention will become more apparent from the following description when taken in conjunction with the accompanying drawings in which a preferred embodiment of the present invention is shown by way of illustrative examples.

BRIEF DESCRIPTION OF THE DRAWINGS

FIG. 2 is a plan view, or a view shown in the direction of an arrow x in FIG. 1, of a casing in the vacuum valve according to the present invention, FIG. 3(*a*) is a sectional view taken along the line X–B in FIG. 2, FIG. 3(*b*) is a sectional view taken along the line X–C in FIG. 2, FIGS. 4(*a*) and 4(*b*) respectively show the operation of the vacuum valve according to the present invention.

PREFERRED EMBODIMENT OF THE INVENTION

One preferred embodiment of the vacuum valve according to the present invention will be described below with reference to FIGS. 1 to 4.

Figure 1:
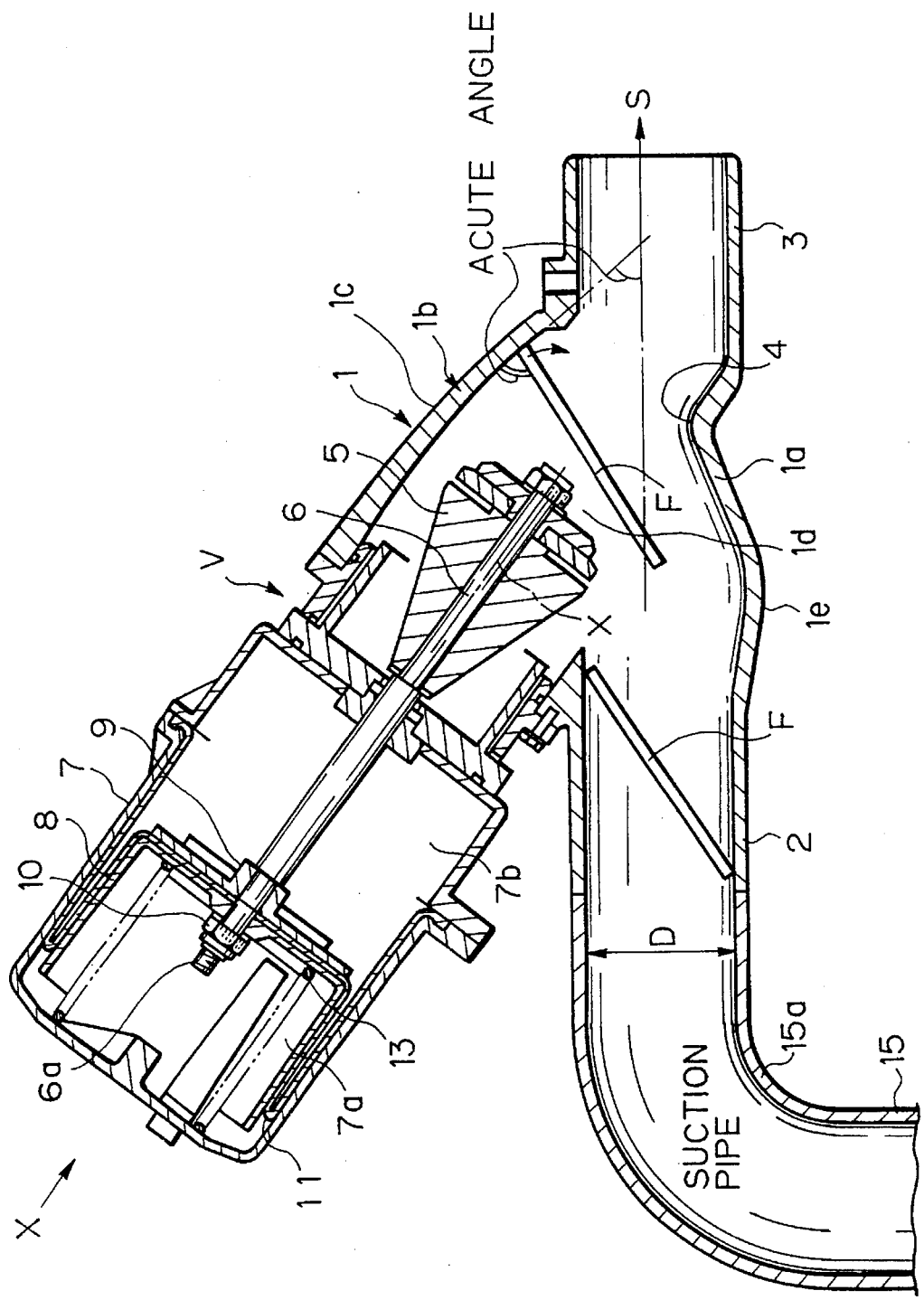
FIG. 1 is a sectional view showing one embodiment of the vacuum valve according to the present invention.
Figure 3B:
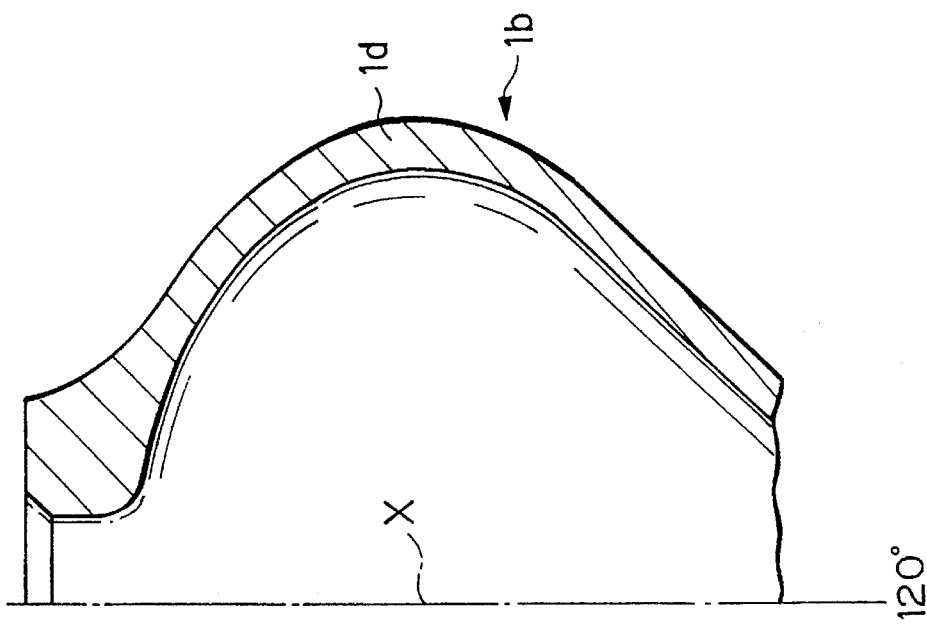
Figure 3A:
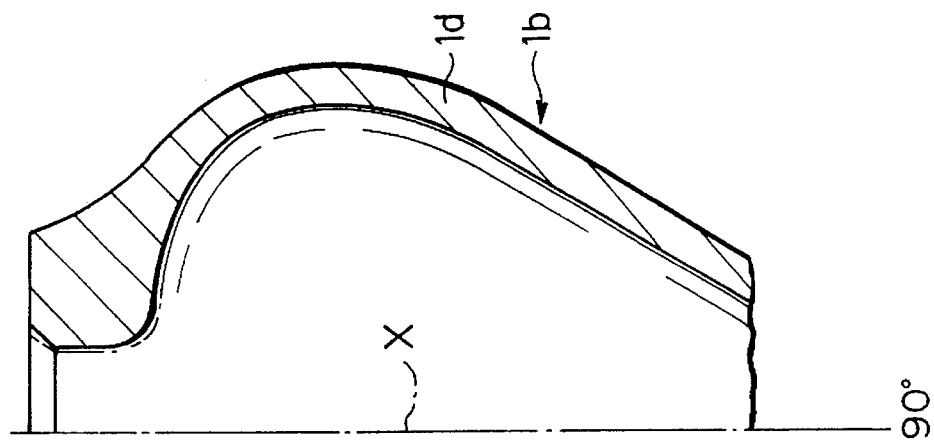

FIG. 1 is a sectional view of the vacuum valve of the present invention, FIG. 2 is a plan view of a casing, FIG. 3(*a*) is a sectional view taken along the line X–B in FIG. 2, and FIG. 3(*b*) is a sectional view taken along the line X–C in FIG. 2. The vacuum valve V has a casing 1 having an approximately Y-shaped cross-sectional configuration as a whole. The vacuum valve V further has a valve body 5 disposed in the casing 1 in such a manner as to be movable obliquely, and a valve rod 6 for supporting the valve body 5.

The casing 1 has a bottom wall 1*a*, and a side wall 1*b* which outwardly expands from the bottom wall 1*a* and, at the same time, extends obliquely upward. The side wall 16 includes a front, side and rear wall portions 1*c*, 1*d* and 1*e*, respectively. The casing 1 has an inlet opening 2 and an outlet opening 3, which extend horizontally. A portion of the bottom wall 1*a* which is contiguous with the outlet opening 3 forms a valve seat 4. The bore (diameter) D of the inlet opening 2 and that of the outlet opening 3 are set equal to each other.

Further, the casing 1 is arranged such that, as shown in FIG. 1, the front wall portion 1*c* of the casing side wall 1*b* is at an acute angle of not larger than 90 degrees to the direction of streamline S that connects the inlet and outlet openings 2 and 3 so that elongate foreign matter F, e.g., disposable wooden chopsticks, which flows in from the inlet opening 2 can readily flow out of the outlet opening 3 by the soiled water flow.

In addition, as shown in FIGS. 2, 3(*a*) and 3(*b*), the side and rear wall portions 1*d* and 1*e* of the casing side wall 1*b* expand outwardly in a direction approximately perpendicular to the axis x of the valve from a position near the valve seat 4 so that bulk foreign matter, e.g., pebbles, flowing in from the inlet opening 2 is prevented from getting caught between the valve body 5 and the casing side wall 1*b*. It was found that the degree of expansion of the casing side wall 1*b* is sufficient if it is so set that when the valve body 5 is released from the position where it rests on the valve seat 4, the distance between the outer peripheral portion of the valve body 5 and the casing inner wall is at least 0.8D in the circumferential range including an angular range of approximately 120 degrees at the inlet opening side, as shown in FIG. 2. Further, the degree of expansion of the casing side wall 1*b* preferably increases as the distance from the outlet opening 3 increases toward the inlet opening 2, as shown in FIGS. 3(*a*) and 3(*b*).

In addition, the acute angle formed between the front wall portion 1C and the direction of streamline S connecting the inlet opening 2 and the outlet opening 3 is preferably set at not larger than 60 degrees.

The valve body 5 has an approximately conical configuration, and the valve rod 6 for supporting the valve body 5 extends obliquely. Meanwhile, a piston housing 7 is installed on the upper end of the casing 1, and a piston 8 is reciprocatably disposed in the piston housing 7. The upper end portion of the valve rod 6 is formed with a thread 6*a*. The piston 8 is integrally secured to the upper end portion of the valve rod 6 by being clamped between a plate 9 and a nut 10.

A diaphragm 11 is stretched between the piston 8 and the piston housing 7 so that the diaphragm 11 defines two chambers, that is, a vacuum chamber 7*a* and an atmospheric air chamber 7*b*, in the piston housing 7. A compression coil spring 13 is installed in the piston 8, which is formed in the shape of a container, for pressing the valve body 5 obliquely downward. The valve body 5 is pressed by the force of the spring 13 to rest on the valve seat 4 to effect sealing.

On the other hand, when a vacuum from a vacuum source (not shown) acts on the vacuum chamber 7*a* and thus causes the piston 8 to move obliquely upward, the valve body 5 moves obliquely upward through the valve rod 6. Thus, valve body 5 is released from the position where it rests on the valve seat 4, resulting in the valve being open.

The operation of the vacuum valve V arranged as described above will be explained below with reference to FIGS. 1, 4(*a*) and 4(*b*).

The gap between the lower end of a suction pipe 15 of the vacuum valve V and the bottom of a soiled water basin (not shown) is set so as to be smaller than the bore D of the vacuum valve V. The reason for this is to prevent foreign matter almost as large as the bore D of the vacuum valve V from being sucked and closing the vacuum valve V or the suction pipe 15. Foreign matter almost as large as the bore D of the vacuum valve is blocked by the gap between the suction pipe 15 and the bottom of the soiled water basin. The gap is generally set at a value which is 0.8 to 0.9 times the bore D of the vacuum valve V.

Thus, when the valve is to be opened, the vacuum source (not shown) is communicated with the vacuum chamber 7*a*, thereby allowing the piston 8 to be moved obliquely upward by the pressure difference between the vacuum chamber 7*a* and the atmospheric air chamber 7*b*. Consequently, the valve body 5 moves obliquely upward through the valve rod 6. Thus, the valve body 5 is released from the position where it rests on the valve seat 4, resulting in opening of the valve.

Figure 4A:
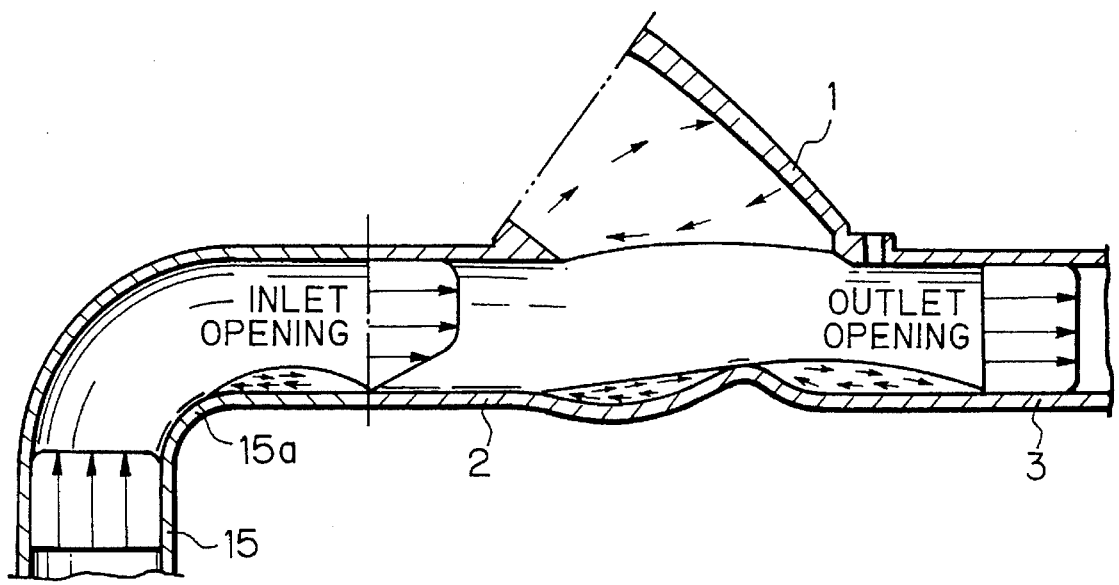
Figure 4B:
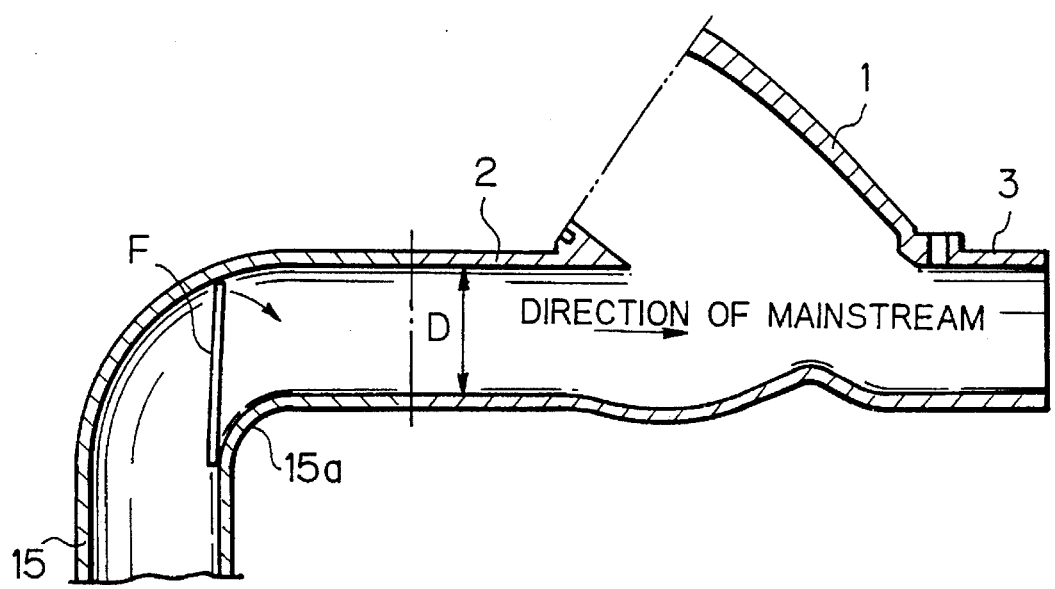
Figure 5:
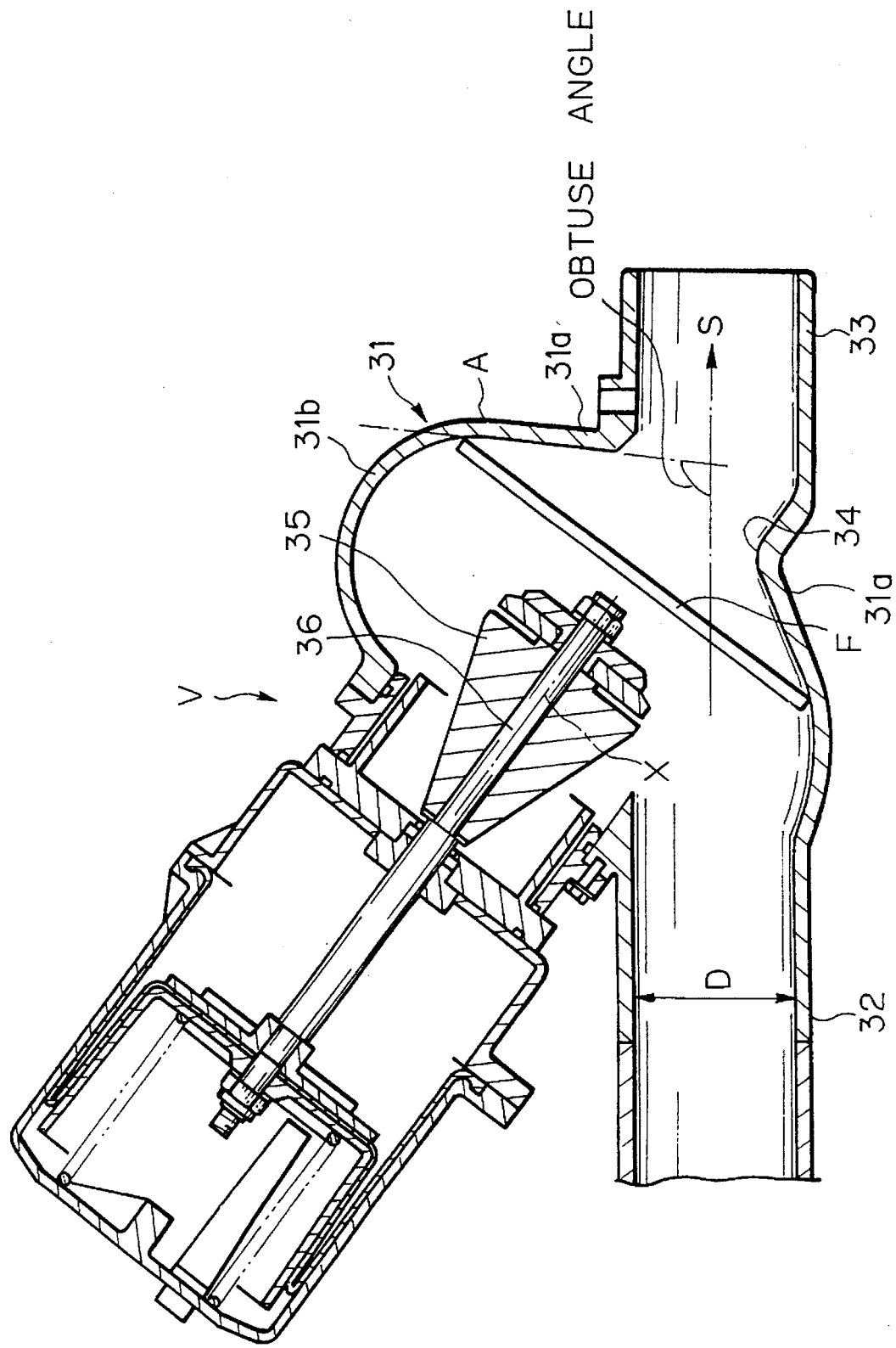
FIG. 5 is a sectional view of a conventional vacuum valve.

Thus, soiled water collected in the soiled water basin is sucked in from the suction pipe 15 and sent to a vacuum sewer pipe through the vacuum valve V. Since a 90-degree bend 15*a* is provided immediately in front of the vacuum valve V, the flow velocity at the upper region in the pipe is remarkably higher than that at the lower region, as will be clear from FIG. 4(a), which shows the flow velocity distributions at the inlet and outlet openings 2 and 3 of the vacuum valve. Accordingly, as shown in FIG. 4(b), elongate foreign matter F, e.g., disposable wooden chopsticks, which bumps against the upper inner wall of the bend 15a is pushed at its head. Therefore, it is easy for the foreign matter F to assume a position parallel to the direction of the main streamline. Accordingly, elongate foreign matter F having a length in the range of from D to 4D/3 remains in the mainstream of flow moving from the inlet opening 2 to the outlet opening 3 and can readily flow out.

Even if elongate foreign matter F deviates from the mainstream of flow and comes into contact with the front wall portion 1c of the side wall 1b as shown in FIG. 1, since the front wall portion 1C and the direction of the stream line S connecting the inlet and outlet openings 2 and 3 are at an acute angle to each other, the head of the elongate foreign matter F is pushed downwardly by the soiled water flow as shown by the arrow. Therefore, the elongate foreign matter F remains in the mainstream of flow, and there is no likelihood of the foreign matter F getting caught between the casing walls.

In a case where, as shown in FIG. 1, elongate foreign matter F longer than 4D/3 flows in at the largest angle to the inner wall of the suction pipe 15 having the same bore as the bore D of the inlet opening 2, even when the foreign matter F comes into contact with the front wall portion 1c of the side wall 1b while keeping its posture, the foreign matter F is encouraged to flow out because the front wall portion is sloped so that the foreign matter abuts on the front wall portion at an acute angle.

Further, since a wide space is formed in the vicinity of the valve seat 4 inside the casing 1, a sufficiently large space for bulk foreign matter F, e.g., pebble, which may flow in, is formed between the valve body 5 and the bottom and side walls 1a and 1b of the casing 1. That is, the distance between the valve body 5 and the casing inner wall in the side and rear wall portions 1d, 1e and the bottom wall 1a is set at 0.8D or more over a range of at least 120 degrees around the valve axis. Therefore, an area required for passage of bulk foreign matter is ensured between the valve body 5 and the casing inner wall. Thus, bulk foreign matter is prevented prom getting caught between the valve body 5 and the casing inner wall, and hence it is possible to prevent the movement of the valve body 5 from being restrained by the presence of the foreign matter.

As has been described above, according to the present invention, the front wall portion of the side wall is at an acute angle to the direction of a streamline connecting the inlet and outlet openings. Therefore, even when elongate foreign matter, e.g., disposable wooden chopsticks, comes into contact with the casing inner wall, the head of the foreign matter is pushed down by the water flow along the wall surface. Accordingly, the foreign matter remains in the mainstream of flow, and there is no likelihood of foreign matter getting caught in the valve.

Further, according to the present invention, the casing inner wall in the side and rear wall portions of the side wall expands outwardly in a direction approximately perpendicular to the valve axis from a position near the valve seat. Therefore, a wide space is formed in the vicinity of the valve seat inside the casing, and a sufficiently large space for bulk foreign matter, pebbles, which may flow in, is formed between the valve body and the casing inner wall surface. Accordingly, bulk foreign matter is prevented from getting caught between the valve body and the casing inner wall when the valve is opened or closed. The invention is a skillful consolidation of a casing shape which prevents clogging of an elongate foreign matter and a casing shape which prevents clogging of a bulk foreign matter which are in compatible to each other. In addition, since there is no possibility that the valve body will remain in a half-open position, which might otherwise occur when foreign matter gets caught between the valve body and the casing inner wall, it is possible to prevent destruction of the vacuum in the entire system, which would otherwise make it impossible to use the system.

What is claimed is:

1. A vacuum valve including a casing having an inlet opening, an outlet opening, and a valve seat, a valve body accommodated in said casing and adapted to move rectilinearly between a position where it rests on said valve seat and a position which is away from said valve seat, means for pressing said valve body to the resting position, and a piston chamber in which an air differential pressure acts so as to separate said valve body from said valve seat against said pressing means, wherein said casing has a front wall portion which is set at an acute angle to a direction of a streamline connecting said inlet and outlet openings and extends from a front portion of said valve seat which is disposed at less than 90 degrees to the direction of said streamline so that elongate foreign matter flowing in from said inlet opening can readily flow out, and side and rear wall portions expanding outwardly in a direction approximately perpendicular to an axis of said valve from a position near said valve seat so that bulk foreign matter flowing in from said inlet opening will not get caught between said valve body and the casing inner wall of said casing.

2. A vacuum valve according to claim 1, wherein when said valve body is released from the resting position, the distance between an outer peripheral portion of said valve body and said casing inner wall is at least 0.8 times the diameter of said inlet opening over a range of at least 120 degrees around said valve axis.

3. A vacuum valve according to claim 1, wherein said acute angle is not larger than 60 degrees.

4. A vacuum valve according to claim 1, wherein said front wall portion has such a slope that when elongate foreign matter longer than 4D/3 (where D is the bore of said inlet opening) flows in at the largest angle to an inner wall of a suction pipe having the same bore as said bore D and comes in contact with said front wall portion while keeping said posture, said elongate foreign matter and said front wall portion are at an acute angle to each other.

* * * * *